(12) United States Patent
Dake et al.

(10) Patent No.: US 12,037,090 B2
(45) Date of Patent: Jul. 16, 2024

(54) AUTOMATIC DOCKING DEVICE

(71) Applicant: Yanmar Power Technology Co., Ltd., Osaka (JP)

(72) Inventors: Yuichiro Dake, Osaka (JP); Naohiro Hara, Osaka (JP); Tomoya Fukukawa, Osaka (JP); Toshiyuki Yokoue, Osaka (JP); Yasuhiro Ueda, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 577 days.

(21) Appl. No.: 17/284,426

(22) PCT Filed: Aug. 20, 2019

(86) PCT No.: PCT/JP2019/032445
§ 371 (c)(1),
(2) Date: Apr. 9, 2021

(87) PCT Pub. No.: WO2020/075393
PCT Pub. Date: Apr. 16, 2020

(65) Prior Publication Data
US 2021/0347449 A1 Nov. 11, 2021

(30) Foreign Application Priority Data
Oct. 10, 2018 (JP) .................................. 2018-192126

(51) Int. Cl.
*B63B 49/00* (2006.01)
*B63B 79/10* (2020.01)
(Continued)

(52) U.S. Cl.
CPC .............. *B63B 49/00* (2013.01); *B63B 79/10* (2020.01); *B63B 79/40* (2020.01); *G01S 17/89* (2013.01);
(Continued)

(58) Field of Classification Search
CPC ......... B63B 49/00; B63B 79/40; B63B 79/10; B63B 2213/00; B63B 69/00; G01S 17/89;
(Continued)

(56) References Cited

U.S. PATENT DOCUMENTS

2020/0042004 A1* 2/2020 Fujiyama ............. G05D 1/0206

FOREIGN PATENT DOCUMENTS

JP 2003276677 A * 10/2003
KR 102465191 B1 * 11/2022

OTHER PUBLICATIONS

Kang Dae Woong, "KR-102465191-B1 Translated", 2022 (Year: 2022).*

(Continued)

*Primary Examiner* — Navid Z. Mehdizadeh
*Assistant Examiner* — Shelley Marie Osterhout
(74) *Attorney, Agent, or Firm* — Chris Mizumoto

(57) ABSTRACT

A LiDAR included in this automatic docking device measures the distance to a surrounding object at each predetermined angle by irradiating the object with light and receiving the light reflected by the object. When a ship offshore is instructed to perform automatic docking, the ship navigates to some extent by automatic navigation based on satellite positioning, and is then switched to automatic navigation based on the LiDAR. Before switching to the automatic navigation based on the LiDAR, the LiDAR performs preparatory measurement for measuring the distance to an object around a docking position. In this preparatory measurement, a control unit controls to change, for example, the orientation of the ship such that light emitted from the LiDAR can be reflected by the object around the docking position and can be received by the LiDAR.

11 Claims, 7 Drawing Sheets

(51) Int. Cl.
    *B63B 79/40*     (2020.01)
    *G01S 17/89*     (2020.01)
    *G01S 17/93*     (2020.01)
    *G05D 1/00*     (2024.01)
    *G06V 20/52*     (2022.01)
    *H04N 7/18*     (2006.01)

(52) U.S. Cl.
    CPC ............ *G01S 17/93* (2013.01); *G05D 1/0206* (2013.01); *G06V 20/52* (2022.01); *H04N 7/183* (2013.01)

(58) Field of Classification Search
    CPC ...... G01S 17/93; G05D 1/0206; H04N 7/183; G06V 20/52; B63H 25/04
    See application file for complete search history.

(56) References Cited

OTHER PUBLICATIONS

Kanehiro K, "JP-2003276677-A Translated", 2003 (Year: 2003).*
J. M. Esposito and M. Graves, "An algorithm to identify docking locations for autonomous surface vessels from 3-D LiDAR scans," 2014 IEEE International Conference on Technologies for Practical Robot Applications (TePRA), Woburn, MA, USA, 2014, pp. 1-6, doi: 10.1109/TePRA.2014.6869160. (Year: 2014).*
D. Thompson, E. Coyle and J. Brown, "Efficient LiDAR-Based Object Segmentation and Mapping for Maritime Environments," in IEEE Journal of Oceanic Engineering, vol. 44, No. 2, pp. 352-362, Apr. 2019, doi: 10.1109/JOE.2019.2898762. (Year: 2019).*

\* cited by examiner

AUTOMATIC DOCKING DEVICE

CROSS-REFERENCE

This application is a US National Stage Application under 35 U.S.C. § 371 of International Application No. PCT/JP2019/032445 filed Aug. 20, 2019. Which claims foreign priority of JP2018-192126 filed Oct. 10, 2018 the disclosures of which are hereby incorporated by reference in their entirety.

TECHNICAL FIELD

The present invention relates to an automatic docking device.

BACKGROUND ART

Conventionally, there has been known an automatic docking device that automatically navigates a ship and automatically docks the ship at a pier or the like. Patent Literature 1 discloses an automatic docking device of this type.

The docking support device of Patent Literature 1 includes a distance sensor, a GPS device, and a controller implemented as a function of a navigation control device. The distance sensor measures the distance from a ship to a measurement point that includes a target position. The GPS device detects the current position of the ship and generates position data indicating it. Distance data from the distance sensor and position data from the GPS device are input to the controller. The controller functions as a plurality of functional processing units by executing a predetermined program, and performs calculations for setting a mooring target position. In addition, the controller displays a map and a set mooring target position on a monitor.

In the configuration of Patent Literature 1, a crew member in charge of ship maneuvering can guide the ship to the mooring target position by operating an operation console while viewing a screen of the monitor. In addition, when the ship approaches the mooring target position to some extent (at the time of less than 20 meters), the ship can be guided to the mooring target position by automatic ship maneuvering.

CITATION LIST

Patent Literature

Patent Literature 1: Japanese Patent No. 5000244

DISCLOSURE OF INVENTION

Problems to be Solved by the Invention

However, the configuration of the above-described Patent Literature 1 may not be able to accurately measure the distance with the use of the distance sensor when the distance between the ship and a docking position is long, which may reduce the accuracy of the automatic ship maneuvering.

The present invention has been made in consideration of the above circumstances, and its object is to provide an automatic docking device capable of accurately measuring a distance to an object around a docking position from a long distance with the use of an optical sensor, and smoothly performing automatic docking with the use of the measured data.

Means for Solving the Problems and Effect of the Invention

The problem to be solved by the present invention is as described above, and the means for solving the problem and the effect thereof will be described in the following.

According to an aspect of the present invention, an automatic docking device having the following configuration is provided. That is, this automatic docking device includes an optical sensor, a position information input unit, and a control unit. The optical sensor includes a light emitting part and a light receiving part, and receives, at the light receiving part, light from the light emitting part reflected by an object, to thereby measure a distance to a surrounding object at each predetermined angle. Position data of a ship based on satellite positioning information is input to the position information input unit. The control unit performs a control for automatically navigating and docking the ship to a docking position on a basis of the data acquired by the optical sensor and the position information input unit. The control unit controls the optical sensor to perform a preparatory measurement to measure a distance to an object around the docking position at a stage before a position of the ship obtained on a basis of a measurement result of the optical sensor is used for automatic navigation. When the optical sensor performs the preparatory measurement, the control unit performs at least one of a control for changing an orientation of the ship and a control for moving the ship in such a manner that light irradiated from the light emitting part of the optical sensor can be reflected by the object around the docking position and received by the light receiving part.

As a result, by changing the orientation of the ship or moving the ship, the distance to the object around the docking position located at a relatively long distance can be measured well by the optical sensor. Therefore, the position of the ship in relation to the docking position can be obtained accurately and quickly, and thus the subsequent automatic navigation and control for docking can be performed smoothly.

In the automatic docking device described above, it is preferable to employ the following configuration. That is, this automatic docking device includes an orientation information input unit to which data regarding the orientation of the ship is input. When the optical sensor performs the preparatory measurement, the control unit controls the orientation of the ship on a basis of the data regarding the orientation.

This ensures that the orientation of the ship is suitable for the preparatory measurement by the optical sensor.

In the automatic docking device described above, it is preferable to employ the following configuration. That is, the optical sensor is provided so as to be rotatable with respect to a hull of the ship. When the optical sensor performs the preparatory measurement, the control unit performs a control for rotating the optical sensor with respect to the hull in such a manner that light irradiated from the light emitting part of the optical sensor can be reflected by the object around the docking position and received by the light receiving part.

This makes it possible to achieve an orientation of the optical sensor that is suitable for the preparatory measurement regardless of the orientation of the hull.

In the automatic docking device described above, it is preferable to employ the following configuration. That is, before the preparatory measurement is performed, the control unit causes the ship to automatically navigate on a basis of the position data of the ship acquired by the position information input unit. Before the preparatory measurement is performed, the optical sensor either stops measuring the distance to the surrounding object or measures the distance to the surrounding object at a cycle longer than a measurement cycle in the preparatory measurement.

As a result, when performing the preparatory measurement, it is possible to compensate for the reduction in spatial resolution caused by measuring an object around the relatively distant docking position with the optical sensor by performing a measurement at a relatively short cycle. The power consumption can be reduced by stopping the measurement by the optical sensor or by lengthening the measurement cycle in the stage before the preparatory measurement.

In the automatic docking device described above, it is preferable to employ the following configuration. That is, this automatic docking device includes a camera and an interface unit. The camera captures an image and generates captured image data. The control unit obtains docking position candidates that are a candidate for the docking position by image recognition using the captured image data. The interface unit generates data for displaying one or more of the docking position candidates together with an image captured by the camera. The interface unit outputs data regarding the docking position selected from the displayed docking position candidates by a user to the control unit.

This allows the user to easily specify a docking position from among the presented candidates by referring to the image captured by the camera.

In the automatic docking device described above, it is preferable to employ the following configuration. That is, the control unit generates map data indicating a condition around the docking position. The control unit uses the map data to generate a route for automatically navigating and docking the ship.

This allows, for example, to generate a route for automatically navigating and docking the ship, taking into consideration obstacles existing around the docking position.

In the automatic docking device described above, it is preferable to employ the following configuration. That is, this automatic docking device includes a storage unit that can store data regarding a nautical chart. The control unit generates the map data on the basis of the data regarding the nautical chart stored in the storage unit.

This allows to generate a route for automatically navigating and docking the ship, taking into consideration the information contained in the nautical chart.

In the automatic docking device, it is preferable that the control unit generates the map data on a basis of the data regarding the distance to the surrounding object acquired by the optical sensor.

This allows to generate a route when the ship is automatically navigated and docked, taking into consideration the positions of obstacles and the like actually measured by the optical sensor.

In the automatic docking device described above, it is preferable to employ the following configuration. That is, this automatic docking device includes a camera that captures an image and generates captured image data. The control unit generates the map data on the basis of the captured image data.

This allows to generate a route for automatically navigating and docking the ship, taking into consideration the positions of obstacles and the like obtained by actually capturing the surroundings by the camera.

In the automatic docking device described above, it is preferable to employ the following configuration. That is, the map data is map data that defines whether the area including the docking position is a navigable area or a non-navigable area. The control unit generates a route for automatically navigating and docking the ship in such a manner that the ship passes through the navigable area.

This allows the condition around the docking position to be organized and grasped, and thus a route for automatically navigating and docking the ship can be easily generated.

In the automatic docking device described above, it is preferable to employ the following configuration. That is, this automatic docking device includes an interface unit. When an operation to stop the ship in an emergency is performed on a portable and wirelessly communicable wireless device, the interface unit outputs an emergency stop signal to the control unit. When the emergency stop signal is input, the control unit performs a control for the ship to make an emergency stop.

As a result, in the course of automatically navigating and docking the ship, for example, when the user recognizes the possibility of the ship colliding with an obstacle or the like, the user can immediately stop the ship with the use of a wireless device carried by the user.

DESCRIPTION OF EMBODIMENTS

Figure 1:
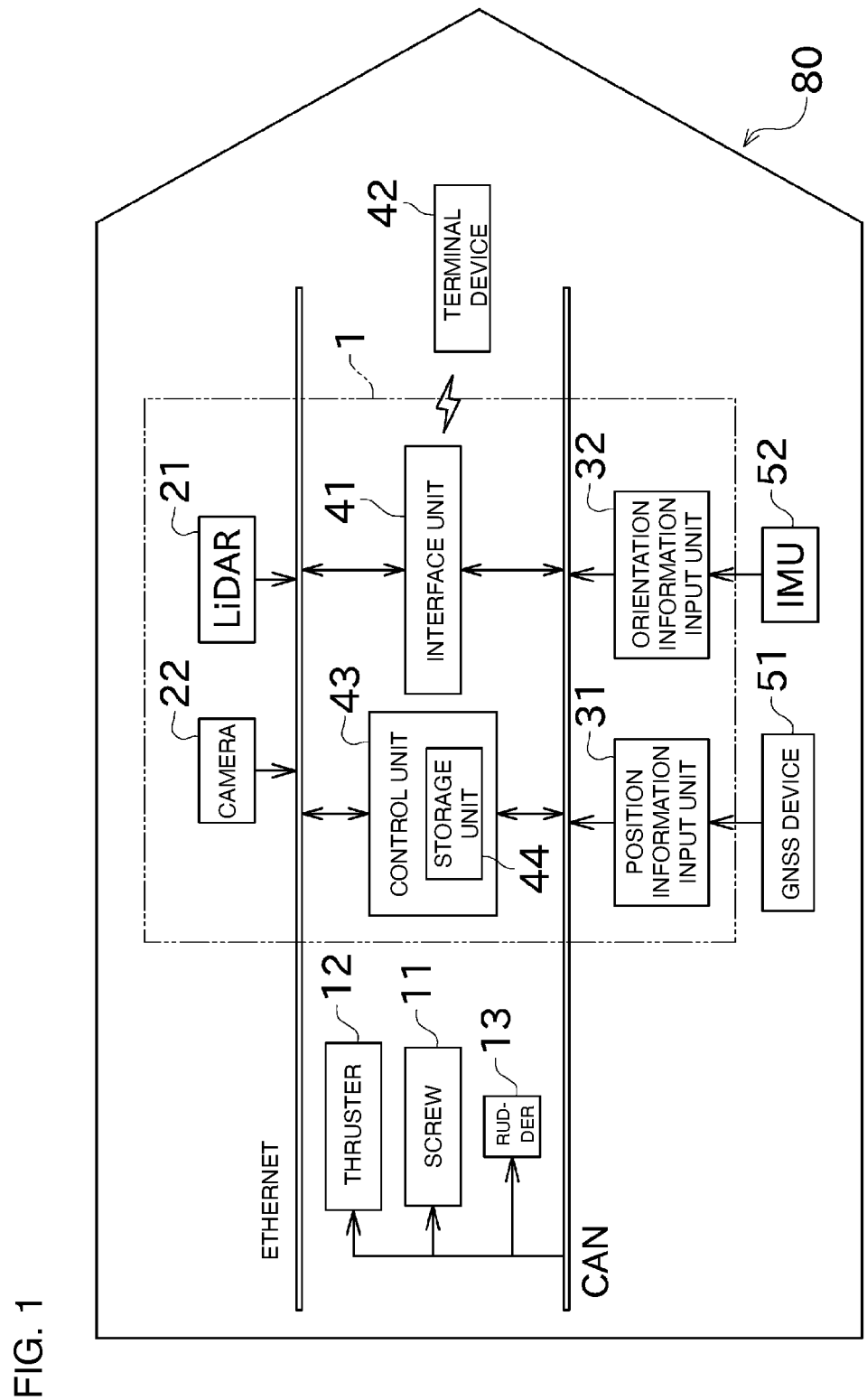
FIG. 1 is a diagram illustrating the electrical configuration of an automatic docking device according to a first embodiment of the present invention.

Next, an embodiment of the present invention will be described with reference to the accompanying drawings. FIG. 1 is a block diagram illustrating the electrical configuration of an automatic docking device 1 according to an embodiment of the present invention.

The automatic docking device 1 of the present embodiment, illustrated in FIG. 1, is mounted on a ship 80 and used. The term "docking" as used herein includes a case of docking the ship 80 on a quay, and a case of docking the ship 80 on a structure such as a pier.

The configuration of the ship 80 to which the automatic docking device 1 is applied is not particularly limited, and can be, for example, a pleasure boat, a fishing boat, a water-jet boat, an electric propulsion boat, a hybrid boat, or the like.

The ship 80 includes a screw 11, a thruster 12, and a rudder 13.

The screw 11 is provided at the stern of the ship 80. The screw 11 is rotated by the driving force of a drive source (engine or electric motor) to propel the ship 80.

The thruster 12 is, for example, a lateral screw provided on the side surface portion at the bow or stern side of the ship 80. The thruster 12 is rotated by the driving force of a drive source (e. g., an electric motor) to provide lateral propulsive force to the ship 80.

The rudder 13 is provided, for example, right behind the screw 11. By driving the screw 11 with the direction of the rudder 13 changed from neutral, the course of the ship 80 can be changed.

The automatic docking device 1 includes a LiDAR (an optical sensor, a ranging sensor) 21, a camera 22, a position information input unit 31, an orientation information input unit 32, an interface unit 41, and a control unit 43.

The LiDAR 21 is disposed at a suitable position (e. g., bow) of the ship 80. The LiDAR 21 includes a light emitting part and a light receiving part. The light emitting part irradiates pulsed light (laser light) outside the visible spectrum range, and the light receiving part receives reflected light that is the pulsed light reflected by an object. The LiDAR 21 detects the presence or absence of an object in the surroundings and, if there is an object, detects the distance to the object on the basis of the time between the irradiation of the pulsed light and the receipt of the reflected light.

The LiDAR 21 repeatedly emits and receives light, (substantially) changing the direction of the pulsed light at predetermined angular intervals. This makes it possible to measure the distance to a surrounding object at each predetermined angle. This angular scanning may be implemented, for example, by mechanically adjusting the orientation of the light emitting part and light receiving part, or by MEMS (micro-electro-mechanical systems), or by a known phased array method.

In the present embodiment, the LiDAR 21 is configured as a three-dimensional LiDAR that performs angular scanning in the yaw and pitch directions. Therefore, the LiDAR 21 can output three-dimensional point cloud data representing objects existing around the LiDAR 21. The LiDAR 21 may output not only the position of a point but also the data regarding the intensity of the reflected light at the position.

The camera 22 is disposed at a suitable position (e. g., bow) of the ship 80. The camera 22 can generate captured image data by capturing an image of the surroundings of the ship 80, and output this captured image data. It is preferable to install the camera 22 in the vicinity of the LiDAR 21 and in such a manner that its image capturing direction coincides with the center of the angular scanning range of the LiDAR 21, because it is easier to correspond the point cloud data of the LiDAR 21 to the captured image data of the camera 22.

The position data of the ship 80 acquired by a GNSS device 51 included in the ship 80 is input to the position information input unit 31. The position information input unit 31 is specifically configured as a connector for CAN communication as described below.

The GNSS device 51 receives GNSS radio waves from a satellite, and performs a known positioning calculation and thereby obtains the current position of the ship 80. Although GNSS positioning can be used alone, it is preferable to use known DGNSS positioning or RTK (Real Time Kinematic) positioning to obtain the position of the ship 80 with high accuracy.

The data output by an IMU 52 included in the ship 80 is input to the orientation information input unit 32. The IMU is an abbreviation for inertial measurement unit. The orientation information input unit 32 is also configured as a connector for CAN communication, as is the case with the position information input unit 31.

The IMU 52 includes an acceleration sensor and can acquire acceleration in three dimensions. In addition, the IMU 52 includes a gyro sensor and can calculate an angular velocity in three dimensions. This allows the ship's orientation (a roll angle, a pitch angle, and a yaw angle) to be obtained. The data regarding the acceleration and orientation of the ship 80 is output to the control unit 43 via the orientation information input unit 32.

The gyro sensor of the IMU 52 can be of various known configurations. However, it is preferable to use a ring laser gyro as the gyro sensor. The ring laser gyro uses the optical path difference of the laser light generated in an optical ring to calculate the angular velocity, and thus can accurately detect the orientation of the ship 80. The ring laser gyro can also be implemented by MEMS (micro-electro-mechanical systems) if a low-cost configuration is desired.

The interface unit 41 is configured as a publicly known computer and includes a CPU, ROM, RAM, and the like. The interface unit 41 provides a user interface function. The interface unit 41 is configured to be able to wirelessly communicate with a terminal device (wireless device) 42 described below. The interface unit 41 can wirelessly transmit data to the terminal device 42 to display various information, and can receive data regarding instructions given by a user to the terminal device 42.

The terminal device 42 is configured, for example, as a tablet-type computer that can be carried by a user. The terminal device 42 includes a display (display unit) that can display various information and a touch panel (operation unit) that the user can touch and operate with a finger. By looking at the display, the user can acquire various information output by the control unit 43 with regard to, for example, automatic docking. In addition, the user can provide various instructions to the control unit 43 by operating the touch panel.

The control unit 43 is configured as a publicly known computer and includes a CPU, ROM, RAM, and the like. The ROM stores a program for performing a control for the ship 80 to automatically navigate to and be docked at a destination by recognizing the surrounding conditions. In addition, the control unit 43 includes a storage unit 44 that can store maps and the like of the surrounding area of the destination to be docked. The functions of the storage unit 44 are mainly implemented by a large-scale storage device (e. g., a flash memory drive) or the like included in the control unit 43.

The control unit 43 is configured to be able to switch between a manual navigation mode and an automatic navigation mode. This mode switching can be performed by the user operating the interface unit 41 (specifically, the terminal device 42).

In the manual navigation mode, the control unit 43 controls to change the rotation speed of the screw 11 and to switch the forward/reverse movement of the ship 80 in response to a user's operation on a propulsion operation unit (e. g., an accelerator lever and a clutch lever) (not illustrated in the figure). In addition, the control unit 43 activates the thruster 12 in response to a user's operation on a thruster operation unit (e. g., a joystick or an operation dial) (not illustrated in the figure). Furthermore, the control unit 43 changes the direction of the rudder 13 in response to a user's operation on a steering operation unit (e. g., a steering wheel) (not illustrated in the figure). As a result of the above, it is possible to achieve navigation to the destination by manual operation.

In the automatic navigation mode, the control unit 43 changes the rotation speed of the screw 11, activates the thruster 12, and changes the direction of the rudder 13, on the basis of various data input from the LiDAR 21, the camera 22, the position information input unit 31, the orientation information input unit 32, and the interface unit 41. This allows navigation to the destination by automatic operation.

As illustrated in FIG. 1, two types of networks are established in the ship 80, one using an Ethernet bus (Ethernet is a registered trademark) and the other using a CAN bus. CAN is an abbreviation for Controller Area Network. The LiDAR 21 and the camera 22 are connected to the Ethernet bus. The GNSS device 51 is connected to the CAN bus via the position information input unit 31, and the IMU 52 is connected to the CAN bus via the orientation information input unit 32. Furthermore, the screw 11, thruster 12, and rudder 13 are connected to the CAN bus, respectively.

The control unit 43 is connected to both the Ethernet bus and the CAN bus. The control unit 43 acquires point cloud data and captured image data from the LiDAR 21 and the camera 22 via the Ethernet bus. Although the data size of the point cloud data and the captured image data tends to be large, the control unit 43 can appropriately acquire the data necessary for processing, with the use of a relatively high-speed Ethernet communication.

The control unit 43 inputs data regarding the position and orientation of the ship 80 via the CAN bus, and outputs control data to the screw 11, and the like. By using CAN communication to exchange these small-sized data, real-time control can be easily ensured.

Figure 2:
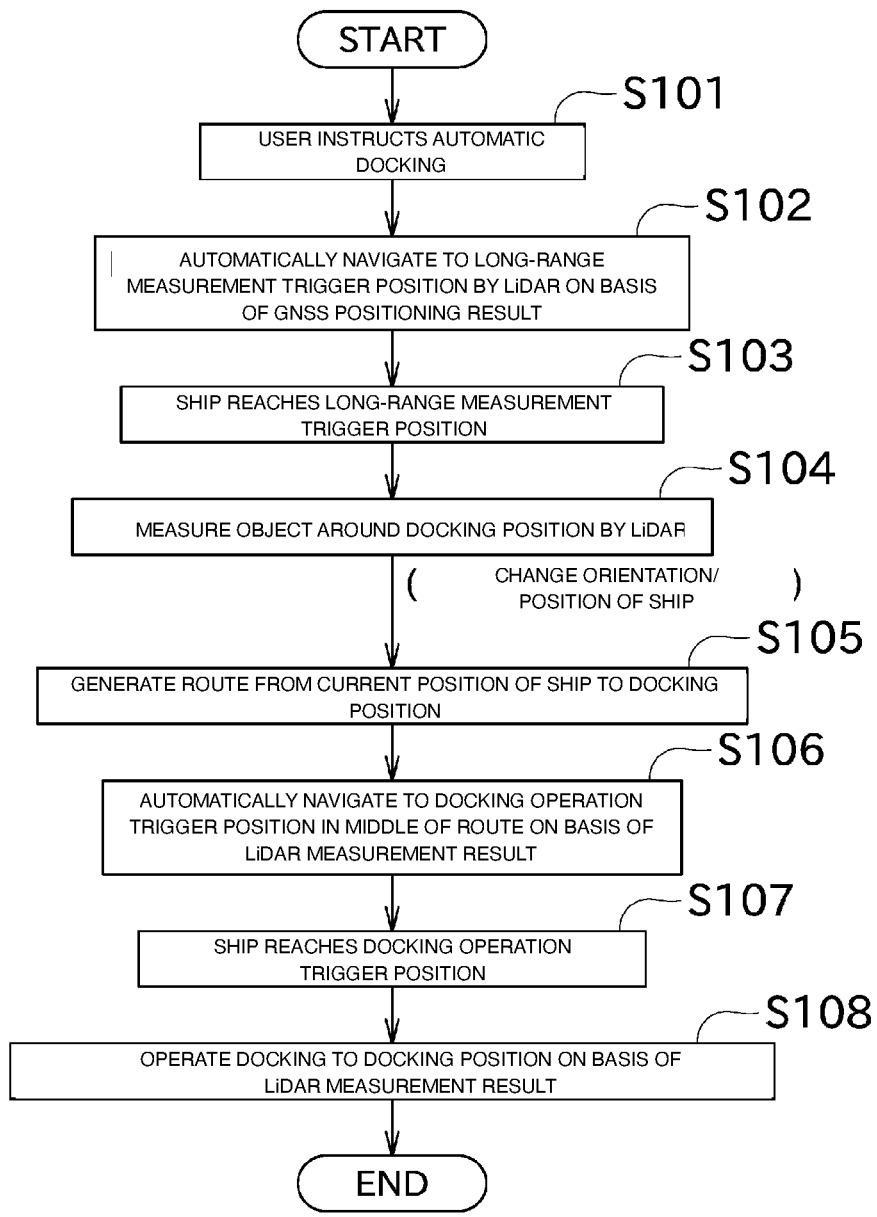
FIG. 2 is a flowchart illustrating an example of a processing flow of the automatic docking device according to the first embodiment.
Figure 3:
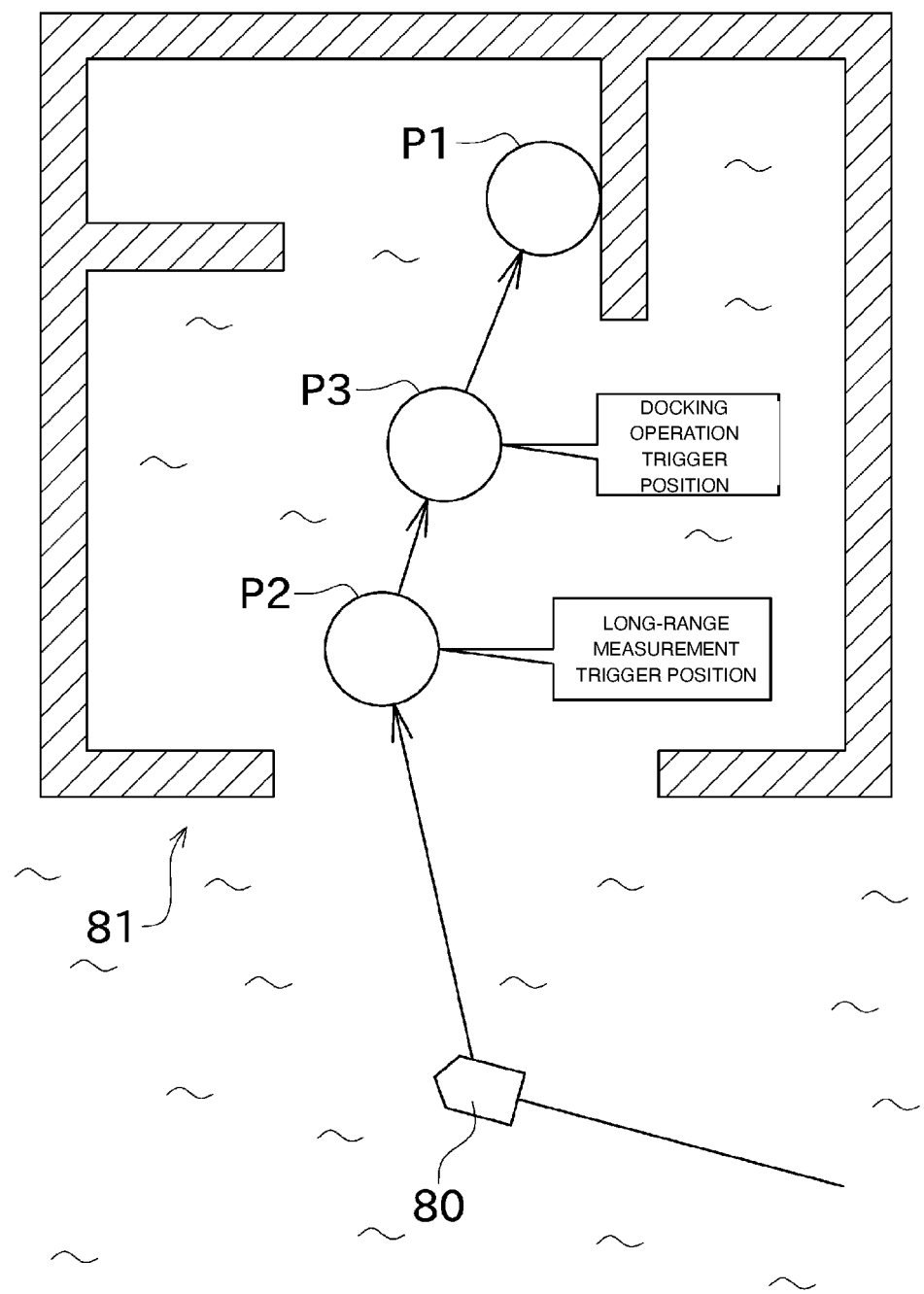
FIG. 3 is a diagram for explaining an example of automatic docking.

Next, a control regarding the automatic docking of the ship 80 will be described in detail. FIG. 2 is a flowchart illustrating an example of a processing flow of the automatic docking device 1. FIG. 3 is a schematic diagram explaining an example of automatic docking.

With the ship 80 offshore and navigating manually, the user instructs the control unit 43 via the interface unit 41 to dock the ship by automatic navigation (step S101 in FIG. 2). In the present embodiment, the position (docking position P1) to which the ship 80 should finally be moved is preset by the user in the form of a latitude and a longitude, for example.

Instructions for automatic navigation and docking are given in the present embodiment by the user speaking into a microphone included the terminal device 42 and voice recognition of the content of the user's speech. However, the instructions may be given by, for example, an operation on the touch panel by the user, or by gesture recognition of hand movements or the like with the use of the camera of the terminal device 42.

In response to this instruction, the control unit 43 switches from the manual navigation mode to the automatic navigation mode and automatically navigates the ship 80 to a predetermined position (step S102).

For example, in a case where the piers are arranged in an intricate manner in a port 81, the ship must pass through a complex route to reach the docking position P1. In consideration of this, the target position when the ship 80 is automatically navigated in step S102 is not set to the docking position P1 that is the final target position, but is set to a suitable position before the docking position P1 (a long-range measurement trigger position P2 described below). This long-range measurement trigger position P2 corresponds to an intermediate target position.

The long-range measurement trigger position P2 is defined as a position where the distance to an object around the docking position P1 can be measured with the use of the LiDAR 21 when the ship is at the position. The long-range measurement trigger position P2 is determined in such a manner that the long-range measurement trigger position P2 is some distance from the docking position P1 and the object around the docking position P1 is included within the range that can be measured by the LiDAR 21 with reference to the long-range measurement trigger position P2. The distance between the docking position P1 and the long-range measurement trigger position P2 may be, for example, approximately 50 meters, although the distance depends on the performance of the LiDAR 21.

The specific method for determining the long-range measurement trigger position P2 is arbitrary. For example, when the ship 80 leaves a certain pier and arrives at the same pier, the point where the route obtained by the transition of the position by GNSS positioning when the ship 80 goes out to sea on the outward trip and the virtual circle of a radius of 50 meters centering on the docking position P1 intersect each other may be obtained in advance and stored, and the point may be set as the long-range measurement trigger position P2. In addition, the long-range measurement trigger position P2 may also be configured to be specified by the user.

In step S102, the control unit 43 navigates the ship 80 with the use of the position data of the ship 80 acquired by the position information input unit 31. In other words, automatic navigation based on the GNSS positioning results output by the GNSS device 51 is performed.

In the process of moving the ship 80 to the long-range measurement trigger position P2 in step S102, the control unit 43 uses the data acquired by the LiDAR 21 and the camera 22 to monitor the surroundings of the ship 80. The ship speed at this time can be a suitable speed, for example, 10 knots or more. It is preferable that the ship speed be set so as to be not too high in such a manner that the ship can avoid an obstacle with a margin when the obstacle is detected by the LiDAR 21 or the camera 22.

In the present embodiment, the long-range measurement trigger position P2 is defined as a position slightly inside from the entrance of the port 81. While navigating the ship 80 in step S102, if detecting in a suitable manner (e. g., by GNSS positioning) that the ship 80 has entered the inside of the port 81, the control unit 43 automatically reduces the ship speed. This allows proper automatic navigation in the inside of the port 81, which is often congested. The ship speed at this time can be approximately 7 knots, for example.

Eventually, the ship 80 reaches the long-range measurement trigger position P2 (step S103). When the GNSS positioning detects that the current position of the ship 80 is at or near the long-range measurement trigger position P2, the control unit 43 enters the automatic docking mode, which is a special case of the automatic navigation mode.

In the automatic docking mode, the control unit 43 first measures the distance to an object around the ship 80 with the use of the LiDAR 21 (step S104). In doing so, it is important for the subsequent docking operation that the distance to an object around the docking position P1 is measured by the LiDAR 21.

The LiDAR 21 is originally used to detect obstacles in the vicinity of the ship 80 to avoid collisions. However, in step S104, the LiDAR 21 detects the object around the docking position P1 from a position some distance away from the docking position P1. Therefore, in the following description, the measurement at this time may be referred to as a "long-range measurement". This long-range measurement prepares the data necessary to automatically navigate and dock the ship 80 to the docking position P1 with the use of the LiDAR 21. Therefore, this long-range measurement can be called a preparatory measurement.

Since the ship 80 is underway at the long-range measurement trigger position P2, the ship 80 may be in a front upward orientation and the LiDAR 21 may be pointing diagonally upward, for example. Accordingly, the control unit 43 causes the bow of the ship 80 to swing in the up-down direction by decelerating the ship 80 before performing the detection of step S104. As a result, the object around the docking position P1 is included in the scanning range in the up-down direction by the LiDAR 21. This deceleration may be performed while monitoring the orientation of the ship 80 output by the IMU 52, or the ship 80 may be simply decelerated without monitoring the orientation.

The LiDAR 21 scans the surrounding objects by changing the angle of the pulsed light at predetermined angular intervals. Therefore, in a state where the ship 80 is located at or near the long-range measurement trigger position P2, when the LiDAR 21 is used to detect an object around the docking position P1, the spatial detection resolution is reduced because the distance between the long-range measurement trigger position P2 and the docking position P1 is long. In addition, if the orientation of the ship 80 changes slightly in the pitch direction, the object around the docking position P1 is likely to deviate from the detection angle range of the LiDAR 21. In this regard, in the present embodiment, since the long-range measurement is performed with the LiDAR 21 in an appropriate orientation, the object around the docking position P1 can be detected well.

In addition, depending on the positional relation between the long-range measurement trigger position P2 and the docking position P1, the LiDAR 21 may not be able to detect the object around the docking position P1 well when the ship 80 is at the long-range measurement trigger position P2. For example, if the pulsed light emitted from the light emitting part of the LiDAR 21 does not hit the surface of the pier corresponding to the docking position P1 (in detail, the surface on the side where the ship 80 is moored) substantially perpendicularly, the light receiving part of the LiDAR 21 cannot receive the reflected light well. Accordingly, when the LiDAR 21 fails to acquire good point cloud data regarding the object around the docking position P1, the control unit 43 moves the ship 80 from the long-range measurement trigger position P2 to a position where the light emitting part of the LiDAR 21 generally faces the surface of the pier (the surface on the side where the ship 80 is moored). This enables the LiDAR 21 to receive well the reflected light that the pulsed light is reflected on the pier. In this state, the control unit 43 causes the long-range measurement by the LiDAR 21 to be performed again. As described above, in the present embodiment, since the long-range measurement is performed after the LiDAR 21 is moved to a good position, the object around the docking position P1 can be detected well.

The control unit 43 detects the docking position P1 in the space where the point cloud data is located, on the basis of the longitude and latitude of the docking position P1, the GNSS positioning results of the ship 80, and the geometrical features of the point cloud data acquired by the LiDAR 21. This allows the position of the ship to be measured with an error of a few centimeters or less with the use of the LiDAR 21 in the form of a position relative to the docking position P1 (pier).

After that, the control unit 43 calculates the route taken by the ship 80 from the current position of the ship to the docking position P1 (step S105). In other words, a ship route plan for the ship 80 is developed. In doing so, the route of the ship 80 is generated with the use of the result of the long-range measurement by the LiDAR 21 obtained in step S104.

The point cloud obtained by the long-range measurement means the obstacle which is out of the water surface in most cases. Therefore, the control unit 43 generates a route so as to avoid the point cloud. The route created by the control unit 43 is, for example, preferably a route such that the ship 80 approaches the pier at an angle of 30° with respect to the longitudinal direction of the pier, because it is easy for the ship 80 to be docked.

Next, the control unit 43 causes the ship 80 to automatically navigate to a predetermined position in the middle of the route obtained in step S105 (step S106).

Specifically, the control unit 43 first defines as appropriate a docking operation trigger position P3 in the middle of the above route, as illustrated in FIG. 3. This docking operation trigger position P3 is set at a suitable position that is in front of the docking position P1 but sufficiently close to the docking position P1.

After defining the docking operation trigger position P3 as described above, the control unit 43 moves the ship 80 to the docking operation trigger position P3 in accordance with the route obtained in step S105. The ship speed at this time is, for example, 7 knots.

Eventually, the position of the ship 80 reaches the docking operation trigger position P3 (step S107). When detecting that the position of the ship 80 acquired by the LiDAR 21 is at or near the docking operation trigger position P3, the control unit 43 adjusts the ship speed to approximately 2 knots and causes the ship 80 to approach the pier in accordance with the above-described route (step S108). In doing so, the control unit 43 controls the ship 80 in such a manner that the orientation of the hull is along the longitudinal direction of the pier as the ship 80 approaches the pier.

The ship 80 slowly approaches the pier and reaches the docking position P1. When detecting that the position of the ship 80 acquired by the LiDAR 21 coincides with the docking position P1, the control unit 43 applies a propulsive force in a direction that cancels the inertia of the ship 80 by a small amount, and stops the ship 80.

In the process of the automatic navigation of step S106 or the docking operation of step S108, it is possible that the ship 80 may deviate from the route for some reason, such as waves and wind. In this case, the control unit 43 controls the ship 80 to return to the original route on the basis of the current position of the ship 80 acquired using the LiDAR 21. The LiDAR 21 can acquire the position of the ship 80 in a shorter time interval compared to the GNSS positioning. Therefore, the position of the ship 80 can be corrected before the ship 80 is significantly out of the route. Since the control characteristics of the hull are a second-order delay system and it is difficult to bring back the ship 80 once it is swept away, it is particularly advantageous to be able to take early action as described above. In addition, the correction of the position of the ship 80 is performed on the basis of the data acquired by the LiDAR 21. Therefore, the position accuracy of the ship 80 in relation to the surrounding piers and obstacles can be kept high.

As a result of the above, the automatic docking is completed. The user moors the docked ship 80 to the pier with the use of a rope.

In the processing of steps S102-S108, it is preferable that the user can give an emergency stop instruction to immediately stop the automatic navigation or docking operation of the ship 80, for example by operating the terminal device 42. This makes it possible to achieve an emergency stop.

The configuration of the interface unit 41 is not particularly limited if it is capable of outputting a signal corresponding to an input user instruction to the control unit 43. The interface unit 41 can be, for example, a mouse, a keyboard, a touch panel, a gesture recognition device, a voice recognition device, a remote control, a mobile phone, a smart phone, or the like. In addition, the interface unit 41 can also be configured to output a signal in response to an operation performed on a wireless device other than tablet computers (e. g., a mobile phone, a smart phone, a remote controller, etc.). In addition, the remote control by wire instead of wireless may be performed.

Before the ship 80 reaches the long-range measurement trigger position P2 (step S102 of FIG. 2), the control unit 43 controls the LiDAR 21 to measure the surrounding objects at a frequency of, for example, 1-5 times per second. It is considered that even this level of detection frequency is sufficient to detect and avoid obstacles around the ship 80. However, it is also possible to stop the measurement by the LiDAR 21 and let the camera 22 alone perform the monitoring. By lengthening the measurement cycle or stopping the measurement per se, the power consumption of the LiDAR 21 can be reduced.

On the other hand, in the long-range measurement of step S104, which is performed when the ship reaches the long-range measurement trigger position P2, it is preferable to control the LiDAR 21 to perform the measurement at a relatively high frequency (e. g., 20-30 times per second). This can compensate for the reduction in spatial detection resolution when the LiDAR 21 detects a distant object.

As described above, the automatic docking device 1 of the present embodiment includes the LiDAR 21, position information input unit 31, and control unit 43. The LiDAR 21 includes a light emitting part and a light receiving part, and receives, at the light receiving part, light from the light emitting part reflected by an object, to thereby measure a distance to a surrounding object at each predetermined angle. Position data of a ship 80 based on satellite positioning information is input to the position information input unit 31. The control unit 43 performs a control for automatically navigating and docking the ship 80 to the docking position P1 on the basis of the data acquired by the LiDAR 21 and the position information input unit 31. The control unit 43 controls the LiDAR 21 to perform a preparatory measurement to measure a distance to an object around the docking position P1 at a stage before the position of the ship 80 obtained on the basis of a measurement result of the LiDAR 21 is used for automatic navigation. When the LiDAR 21 performs the preparatory measurement, the control unit 43 performs at least one of a control for changing the orientation of the ship 80 and a control for moving the ship 80 in such a manner that light irradiated from the light emitting part of the LiDAR 21 can be reflected by an object around the docking position P1 and received by the light receiving part.

As a result, by changing the orientation of the ship 80 or moving the ship 80, the distance to the object around the docking position P1 located at a relatively long distance can be measured well by the LiDAR 21. Therefore, the position of the ship 80 in relation to the docking position P1 can be obtained accurately and quickly, and thus the subsequent automatic navigation and control for docking can be performed smoothly.

In addition, the automatic docking device 1 of the present embodiment includes the orientation information input unit 32 to which data regarding the orientation of the ship 80 is input. When the LiDAR 21 performs the preparatory measurement, the control unit 43 controls the orientation of the ship 80 on the basis of the data regarding the orientation.

This ensures that the orientation of the ship 80 is suitable for the long-range measurement by the LiDAR 21.

In addition, in the automatic docking device 1 of the present embodiment, before the long-range measurement is performed, the control unit 43 causes the ship 80 to automatically navigate on the basis of the position data of the ship 80 acquired by the position information input unit 31. Before the long-range measurement is performed, the LiDAR 21 measures the distance to the surrounding object at a cycle longer than the measurement cycle in the long-range measurement.

As a result, when performing a long-range measurement, it is possible to compensate for the reduction in spatial resolution caused by measuring an object around a relatively distant docking position P1 with the LiDAR 21, by performing a measurement at a relatively short cycle. Before the long-range measurement is performed, the power saving of the LiDAR 21 can be achieved by lengthening the measurement cycle.

In addition, the automatic docking device 1 of the present embodiment includes the interface unit 41. When an operation to stop the ship 80 in an emergency is performed on a portable and wirelessly communicable terminal device 42, the interface unit 41 outputs an emergency stop signal to the control unit 43. On the basis of the input of the emergency stop signal, the control unit 43 performs a control for the ship 80 to make an emergency stop.

As a result, in the course of automatically navigating and docking the ship 80, when the user recognizes the possibility of the ship 80 colliding with an obstacle or the like, for example, the user can immediately stop the ship 80 with the use of the terminal device 42 carried by the user.

Figure 4:
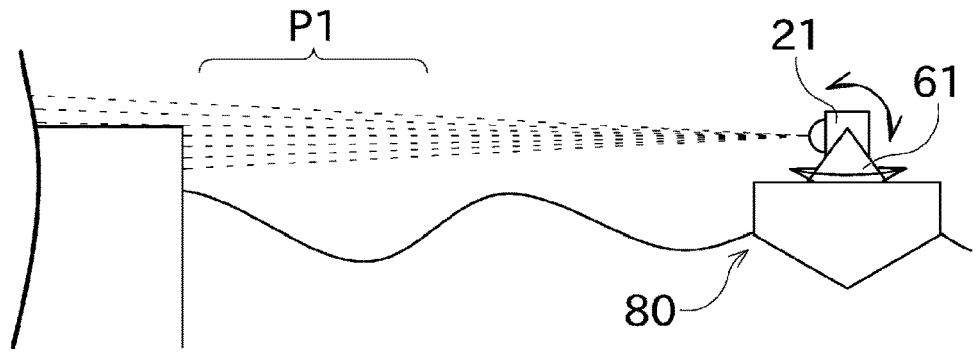
FIG. 4 is a schematic diagram illustrating a LiDAR and a rotation mechanism in an automatic docking device of a second embodiment.

Next, a second embodiment is described. FIG. 4 is a schematic diagram illustrating a LiDAR 21 and a rotation mechanism 61 included in an automatic docking device of the second embodiment. In the description of this and subsequent embodiments, the same or similar parts and materials as those of the aforementioned embodiment are marked with the same sign in the drawings and may be omitted from the description.

In the automatic docking device of the second embodiment illustrated in FIG. 4, the LiDAR 21 is attached to the ship 80 via a rotation mechanism 61. The rotation mechanism 61 can change the orientation of the LiDAR 21 relative to the ship 80 by rotating the LiDAR 21 in the yaw and pitch directions with the use of a suitable drive source.

The control unit 43 controls the rotation mechanism 61 to cancel the sway of the ship 80 that affects the measurement of the LiDAR 21, with the use of the data regarding the orientation of the ship 80 input from the IMU 52 via the orientation information input unit 32. This allows the LiDAR 21 to be pointed stably at the vicinity of the docking position P1 even when the hull is shaken by waves or wind, for example, and thus the long-range measurement by the LiDAR 21 can be performed well.

In the long-range measurement, the control unit 43 may control the rotation mechanism 61 in such a manner that the LiDAR 21 faces an azimuth corresponding to the docking position P1.

As described above, in the automatic docking device of the present embodiment, the LiDAR 21 is rotatable with respect to the hull of the ship 80. When the LiDAR 21 performs the preparatory measurement, the control unit 43 performs a control for rotating the LiDAR 21 with respect to the hull in such a manner that light irradiated from the light emitting part of the LiDAR 21 can be reflected by an object around the docking position P1 and received by the light receiving part.

This makes it possible to achieve an orientation of the LiDAR 21 that is suitable for long-range measurement regardless of the orientation of the hull.

Figure 5:
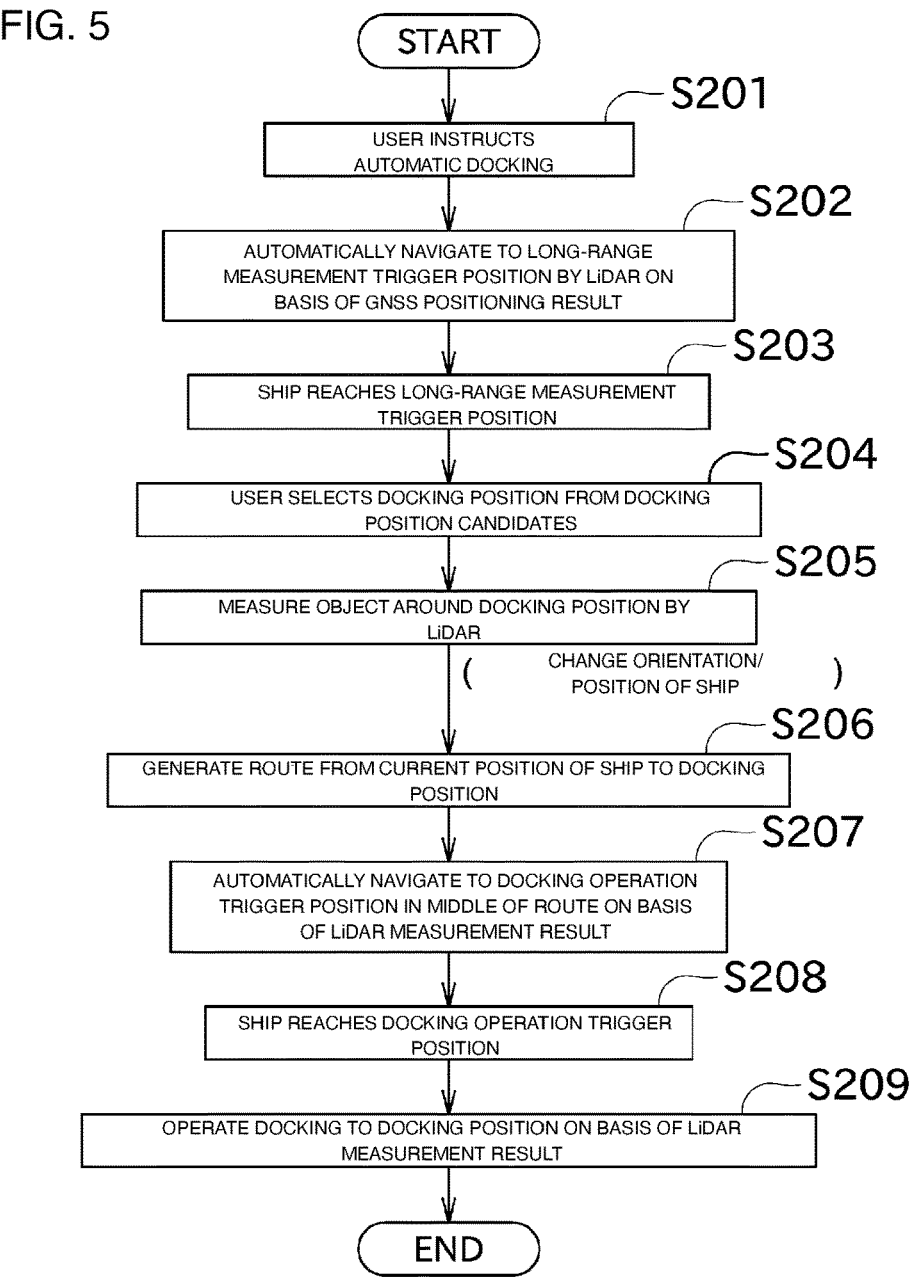
FIG. 5 is a flowchart illustrating a processing flow of an automatic docking device of a third embodiment.
Figure 6:
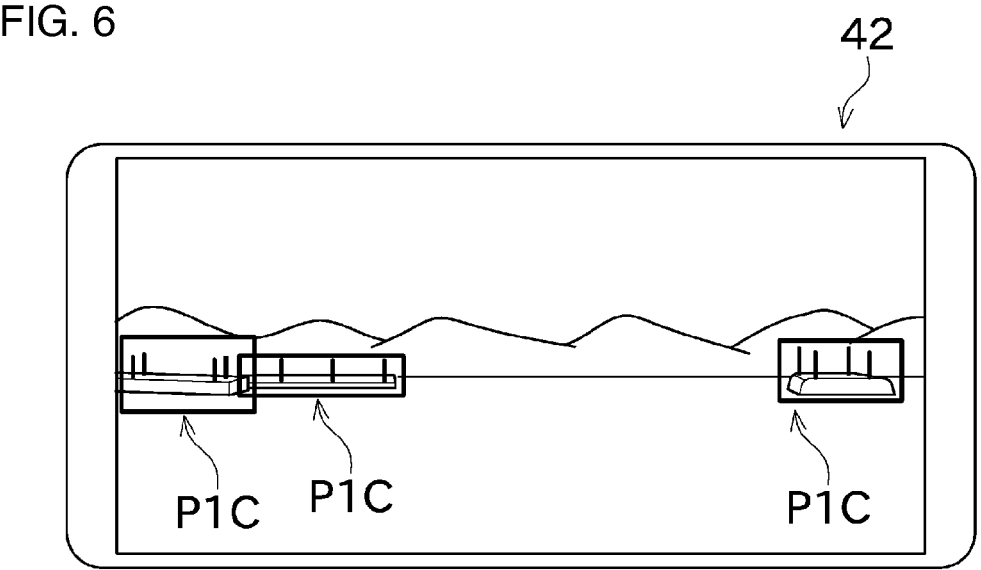
FIG. 6 is a diagram illustrating a display example of a terminal device in a case where a docking position is selected by a user in the automatic docking device of the third embodiment.

Next, a third embodiment is described. FIG. 5 is a flowchart illustrating an example of a processing flow of an automatic docking device according to the third embodiment. FIG. 6 is a diagram illustrating a display example of the terminal device 42 when the user selects the docking position P1 from docking position candidates P1C.

Of the flow of the automatic docking device of the third embodiment illustrated in FIG. 5, the processing of steps S201-S203 is identical to steps S101-S103 in the first embodiment (FIG. 2) described above, and is therefore omitted.

After the ship 80 reaches the long-range measurement trigger position P2 in step S203, the control unit 43 controls the camera 22 to capture the inside of the port 81. After that, the control unit 43 performs a known image recognition process on the captured image data obtained by capturing the inside of the port 81 with the camera 22, thereby detecting a pier.

The specific method for performing the image recognition is arbitrary, but for example, the method may be based on a known RCNN, which is a type of deep learning. This allows the position on the image of each of the one or more piers included in the image captured by the camera 22 to be obtained. In addition, the position of the pier in the image can also be obtained by a so-called semantic segmentation method.

Each of the one or more pier positions obtained is, in effect, a candidate for the docking position P1 of the ship 80 (docking position candidate P1C).

When one or more docking position candidates P1C are obtained, the control unit 43 outputs the captured image data by the camera 22 and the data of the respective docking position candidates P1C to the interface unit 41. The interface unit 41 combines a figure indicating the docking position candidates P1C with the captured image and causes the display of the terminal device 42 to display same. An example of the display in the terminal device 42 is illustrated in FIG. 6, where the figure indicating the docking position candidates P1C can be, for example, a rectangle (bounding box) enclosing the corresponding pier. In FIG. 6, the rectangle is indicated by a bold line.

The user selects, by touching the touch panel with a finger, the figure (bounding box) at the position at which the ship 80 is to be docked among the figures of the docking position candidates P1C displayed on the terminal device 42 (step S204). This allows the user to intuitively specify the docking position P1 at which the ship 80 is to be actually docked. The information indicating the docking position P1 selected by the user is output from the interface unit 41 to the control unit 43.

Subsequent processing (steps S205-S209) is the same as the flow (steps S104-S108) of the first embodiment, and thus the description is omitted.

As described above, the automatic docking device of the present embodiment includes the camera 22 and the interface unit 41. The camera 22 captures an image and generates captured image data. The control unit 43 obtains docking position candidates P1C that are a candidate for the docking position P1 by image recognition using the captured image data. The interface unit 41 generates data for displaying one or more of the docking position candidates P1C together with the image captured by the camera 22. The interface unit 41 outputs data regarding the docking position P1 selected from the displayed docking position candidates P1C by the user to the control unit 43.

This allows the user to easily specify a docking position P1 from among the presented docking position candidates P1C by referring to the capturing result by the camera 22.

Figure 7:
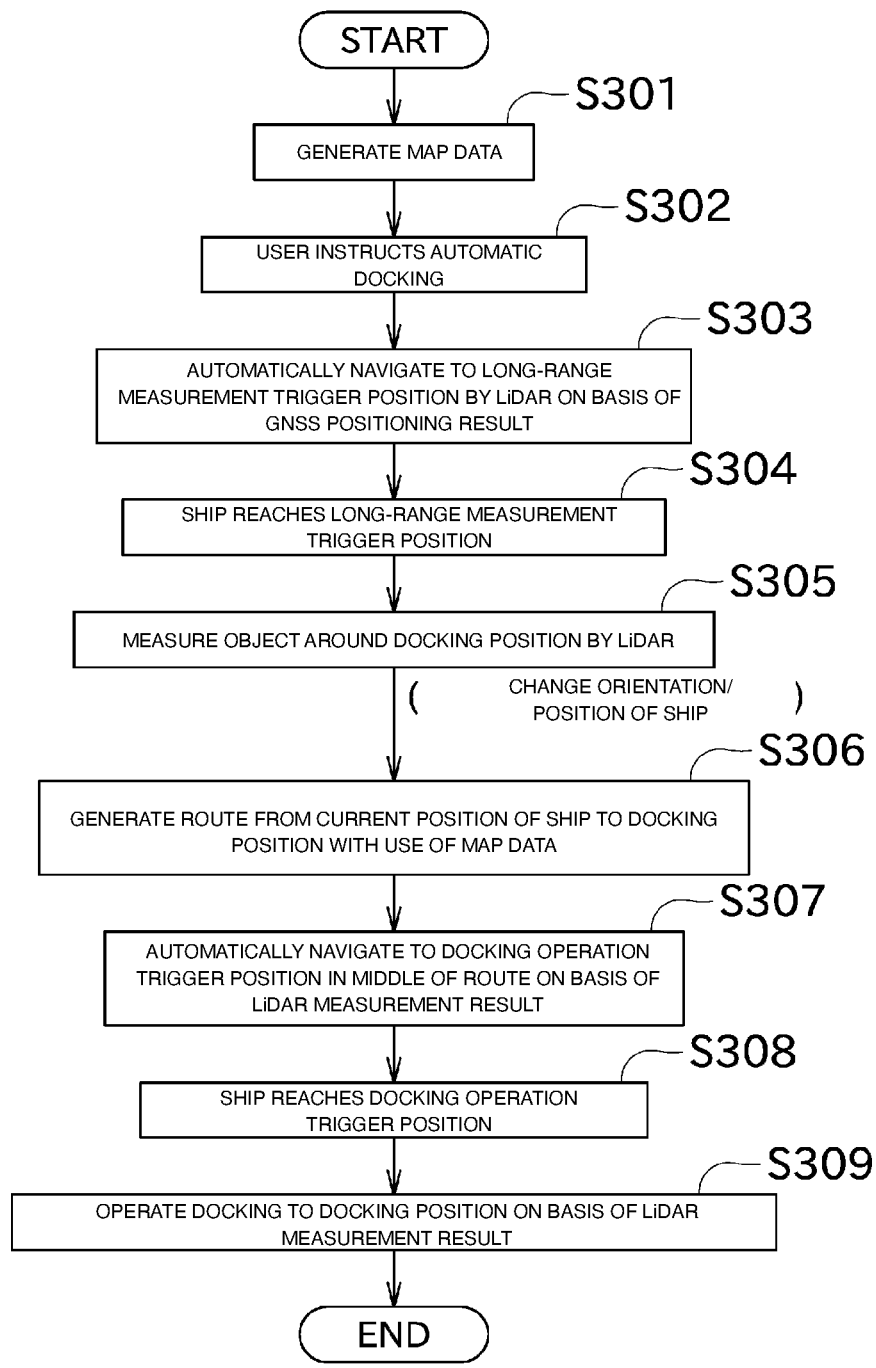
FIG. 7 is a flowchart illustrating a processing flow of an automatic docking device according to a fourth embodiment.
Figure 8:
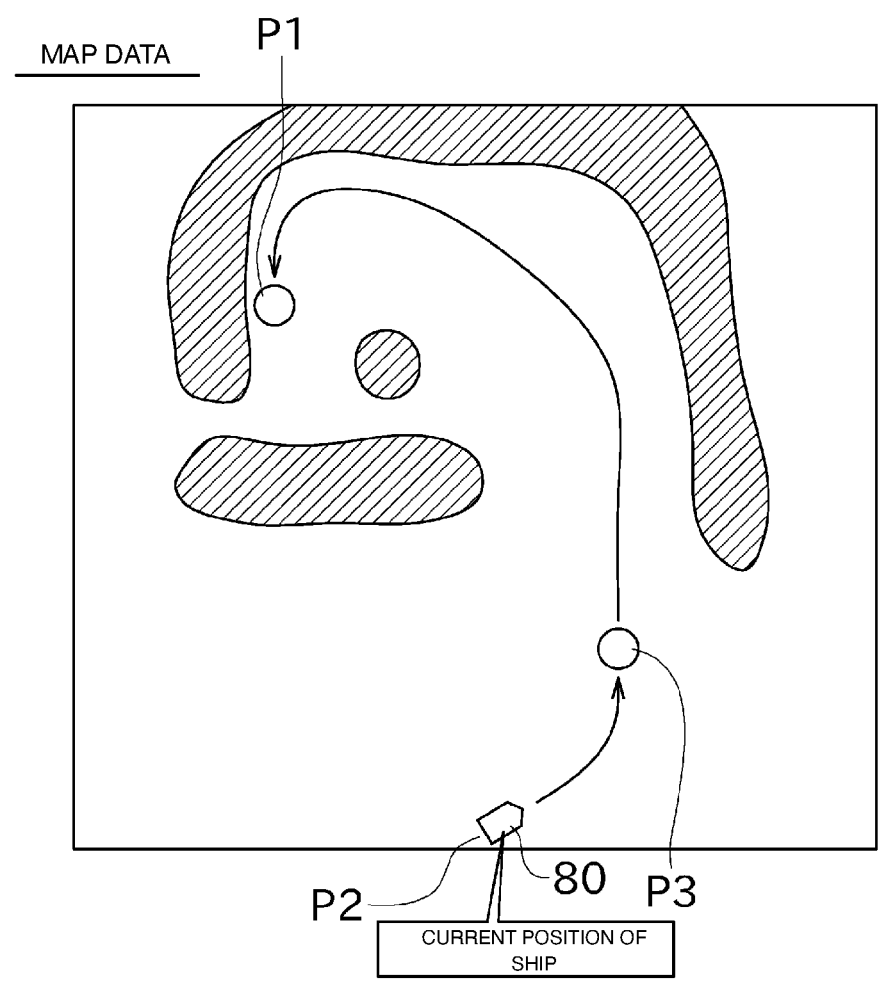
FIG. 8 is a diagram illustrating an example of map data and a route generated in the automatic docking device of the fourth embodiment.

Next, a fourth embodiment is described. FIG. 7 is a flowchart illustrating a processing flow of an automatic docking device according to the fourth embodiment. FIG. 8 is a diagram illustrating an example of map data and a route generated in the automatic docking device of the fourth embodiment.

In the automatic docking device of the fourth embodiment, the flow of which is illustrated in FIG. 7, the control unit 43 differs from that of the first embodiment described above in that the route to the docking position is generated by taking into consideration map data indicating the condition around the docking position.

The map data is pre-generated by the control unit 43 before the user instructs automatic docking (step S301).

There are various ways in which the map data can be generated. For example, the control unit 43 can store the nautical chart data in advance in the storage unit 44 included in the control unit 43, and create the map data with the use of the information of the nautical chart data (e. g., positions of reefs or off-limits areas, etc.).

In addition, the control unit 43 measures the distance to an object located inside the port 81 in advance by the LiDAR 21 to thereby obtain the positions of obstacles and the like and store the positions in the storage unit 44, and can create the map data with the use of this information.

Furthermore, the control unit 43 performs image recognition from the image of the inside of the port 81 captured by the camera 22, to thereby estimate and store the positions of obstacles (e. g., buoys, rocks, piers, etc.), and can create the map data with the use of this information. As a method of the image recognition, RCNN is considered to be used as above. For obstacles near the water surface, such as a buoy and a rock, the direction and distance can be roughly estimated from the position and size of the area where the buoy or the like is detected in the image.

The distance of an obstacle captured by the camera 22 can also be estimated by deep learning. Specifically, a stereo camera or a combination of a LiDAR and a camera is used to prepare a data set including a combination of an image and the distance of the object corresponding to the image from the capturing point, and this data set is learnt by the prediction model. After that, when the image of the obstacle captured by the camera 22 is input to the prediction model, the prediction model outputs the distance of the obstacle from the point where the obstacle was captured.

When the collection of the basic data is completed, the control unit 43 reads the data acquired from the various information sources from the storage unit 44 and compiles the data to generate single map data. In the present embodiment, as illustrated in FIG. 8, the map data is configured in the form of classifying into a "navigable area" and a "non-navigable area" from various information sources.

The processing of steps S302-S305 is identical to steps S101-S104 in the first embodiment (FIG. 2) described above, and is therefore omitted.

After the long-range measurement of step S305 is completed, the control unit 43 matches the point cloud data acquired from the LiDAR 21 by the long-range measurement against the map data generated in step S301. This allows the control unit 43 to obtain to which position of the map data the current position of the ship 80 and the docking position P1 correspond.

The control unit 43 obtains the route of the ship 80 from the current position to the docking position P1 with the use of the map data (step S306). Specifically, the control unit 43 uses a suitable route finding algorithm to find a route for the ship 80 to pass through the navigable area. An example of the generated route is illustrated in FIG. 8.

The control unit 43 may seek a plurality of routes that differ from each other. In this case, the user selects, via the interface unit 41, the route that the user actually wants the ship 80 to navigate.

Subsequent processing (steps S307-S309) is the same as the flow (steps S106-S108) of the first embodiment, and thus the description is omitted.

As described above, in the automatic docking device of the present embodiment, the control unit 43 generates map data indicating the condition around the docking position P1. The control unit 43 uses the map data to generate a route for automatically navigating and docking the ship 80.

This allows, for example, to generate a route for automatically navigating and docking the ship, taking into consideration obstacles existing around the docking position P1.

In addition, the automatic docking device of the present embodiment includes the storage unit 44 that can store data regarding a nautical chart. The control unit 43 generates the map data on the basis of the data regarding the nautical chart stored in the storage unit 44.

This allows to generate a route for automatically navigating and docking a ship, taking into consideration the information contained in the nautical chart (in particular, areas that cannot be navigated due to regulations, etc.).

In addition, in the automatic docking device of the present embodiment, the control unit 43 generates the map data on the basis of the data regarding the distance to the surrounding object acquired by the LiDAR 21.

This allows to generate a route when a ship is automatically navigated and docked, taking into consideration the positions of obstacles and the like actually measured by the LiDAR 21.

In addition, the automatic docking device of the present embodiment includes the camera 22 that captures an image and generates captured image data. The control unit 43 generates map data on the basis of the captured image data.

This allows to generate a route for automatically navigating and docking the ship 80, taking into consideration the positions of obstacles and the like obtained by actually capturing the surroundings by the camera 22.

In addition, in the automatic docking device of the present embodiment, the map data is map data that defines whether the area including the docking position P1 is a navigable area or a non-navigable area. The control unit 43 generates a route for automatically navigating and docking the ship 80 in such a manner that the ship passes through the navigable area.

This allows the condition around the docking position P1 to be organized and grasped, and thus a route for automatically navigating and docking the ship can be easily generated.

Although preferred embodiments of the present invention have been described, the configurations as described above can be modified as stated below, for example.

The ship on which the automatic docking device 1 of the present invention is mounted can be, for example, a single shaft, single rudder ship 80 or a single shaft, two rudder ship 80.

The configuration of the LiDAR 21 is arbitrary, but for example, the LiDAR can be configured to scan a range of 60° or more in the horizontal direction (yaw direction) at angular intervals of 5° or less.

The position at which the LiDAR 21 is mounted on the ship 80 is arbitrary and can be mounted on the bow, the stern, the side of the hull, the top of the wheelhouse, or the like.

DESCRIPTION OF REFERENCE NUMERALS

1 automatic docking device
21 LiDAR (optical sensor)
22 camera
31 position information input unit
32 orientation information input unit
41 interface unit
42 terminal device (wireless device)
43 control unit
44 storage unit
80 ship
P1 docking position
P1C docking position candidate

The invention claimed is:

1. An automatic docking device comprising:
an optical sensor including a light emitting part and a light receiving part, and receiving, at the light receiving part, light from the light emitting part reflected by an object, to thereby measure a distance to a surrounding object at each predetermined angle;
a position information input unit to which position data of a ship based on satellite positioning information is input; and
a control unit performing a control for automatically navigating and docking the ship to a docking position on a basis of the data acquired by the optical sensor and the position information input unit,
wherein the control unit controls the optical sensor to perform a preparatory measurement to measure a distance to an object around the docking position at a stage before a position of the ship obtained on a basis of a measurement result of the optical sensor is used for automatic navigation, and
wherein when the optical sensor performs the preparatory measurement, the control unit performs at least one of a control for changing an orientation of the ship and a control for moving the ship in such a manner that light irradiated from the light emitting part of the optical sensor can be reflected by the object around the docking position and received by the light receiving part.

2. The automatic docking device according to claim 1, comprising an orientation information input unit to which data regarding the orientation of the ship is input, wherein when the optical sensor performs the preparatory measurement, the control unit controls the orientation of the ship on a basis of the data regarding the orientation.

3. The automatic docking device according to claim 1, comprising an interface unit,
wherein when an operation to stop the ship in an emergency is performed on a portable and wirelessly communicable wireless device, the interface unit outputs an emergency stop signal to the control unit, and
wherein when the emergency stop signal is input, the control unit performs a control for the ship to make an emergency stop.

4. An automatic docking device comprising:
an optical sensor including a light emitting part and a light receiving part, and receiving, at the light receiving part, light from the light emitting part reflected by an object, to thereby measure a distance to a surrounding object at each predetermined angle;
a position information input unit to which position data of a ship based on satellite positioning information is input; and
a control unit performing a control for automatically navigating and docking the ship to a docking position on a basis of the data acquired by the optical sensor and the position information input unit,
wherein the control unit controls the optical sensor to perform a preparatory measurement to measure a distance to an object around the docking position at a stage before a position of the ship obtained on a basis of a measurement result of the optical sensor is used for automatic navigation,
wherein the optical sensor is provided so as to be rotatable with respect to a hull of the ship, and
wherein when the optical sensor performs the preparatory measurement, the control unit performs a control for rotating the optical sensor with respect to the hull in such a manner that light irradiated from the light emitting part of the optical sensor can be reflected by the object around the docking position and received by the light receiving part.

5. The automatic docking device according to claim 1,
wherein before the preparatory measurement is performed, the control unit causes the ship to automatically navigate on a basis of the position data of the ship acquired by the position information input unit, and
wherein before the preparatory measurement is performed, the optical sensor either stops measuring the distance to the surrounding object or measures the distance to the surrounding object at a cycle longer than a measurement cycle in the preparatory measurement.

6. The automatic docking device according to claim 1, comprising:
a camera capturing an image and generating captured image data; and
an interface unit,
wherein the control unit obtains docking position candidates that are a candidate for the docking position by image recognition using the captured image data,
wherein the interface unit generates data for displaying one or more of the docking position candidates together with an image captured by the camera, and
wherein the interface unit outputs data regarding the docking position selected from the displayed docking position candidates by a user to the control unit.

7. The automatic docking device according to claim 1,
wherein the control unit generates map data indicating a condition around the docking position, and
wherein the control unit uses the map data to generate a route for automatically navigating and docking the ship.

8. The automatic docking device according to claim 7, comprising a storage unit capable of storing data regarding a nautical chart,
wherein the control unit generates the map data on a basis of the data regarding the nautical chart stored in the storage unit.

9. The automatic docking device according to claim 7, wherein the control unit generates the map data on a basis of the data regarding the distance to the surrounding object acquired by the optical sensor.

10. The automatic docking device according to claim 7, comprising a camera capturing an image and generating captured image data,
wherein the control unit generates the map data on a basis of the captured image data.

11. The automatic docking device according to claim 7, wherein the map data is map data that defines whether an area including the docking position is a navigable area or a non-navigable area, and the control unit generates a route for automatically navigating and docking the ship in such a manner that the ship passes through the navigable area.

* * * * *